United States Patent [19]

Yamamoto et al.

[11] Patent Number: 4,841,376
[45] Date of Patent: Jun. 20, 1989

[54] SHADING CORRECTING METHOD ENABLING PREVENTION OF EFFECT OF NOISE AND APPARATUS THEREFOR

[75] Inventors: Hiroyuki Yamamoto; Masahiko Matsunawa, both of Hachioji, Japan

[73] Assignee: Konishiroku Photo Industry Co., Ltd., Tokyo, Japan

[21] Appl. No.: 80,872

[22] Filed: Aug. 3, 1987

[30] Foreign Application Priority Data

Aug. 15, 1986 [JP] Japan .................................. 61-191207

[51] Int. Cl.$^4$ ............................................. H04N 1/40
[52] U.S. Cl. .................................... 358/282; 353/284; 353/292
[58] Field of Search ................. 358/280, 282, 293, 284; 382/52

[56] References Cited

U.S. PATENT DOCUMENTS 4,237,495 12/1980 Yamamoto ........................... 358/282

Primary Examiner—Edward L. Coles, Sr.
Attorney, Agent, or Firm—Jordan B. Bierman

[57] ABSTRACT

A method of and apparatus for shading correction wherein a reference voltage of an A/D converter converting an image signal into a digital signal is set as a shading correction signal. The image signal and the shading correction signal are designed to be of different level from each other in the timing out of the effective period of the image signal. The shading correction signal is outputted in the timing during the effective period of the image signal and the reference voltage is outputted in the timing out of the effective period of the image signal.

2 Claims, 5 Drawing Sheets

SHADING CORRECTING METHOD ENABLING PREVENTION OF EFFECT OF NOISE AND APPARATUS THEREFOR

BACKGROUND OF THE INVENTION

1. Field of the Invention

The present invention relates to a method of correcting shading in an image reading system of an exposure scanning type, etc., and an apparatus therefor.

2. Description of the Prior Art

In the image reading system, the nonuniformity of the quantity of light occurs on the light-receiving plane of an image pickup element due to the characteristics of a light source, a focusing lens, etc., while picture elements of the image pickup element are nonuniform in sensitivity, and therefore shading occurs in read image signals.

In order to correct this shading, a method using an A/D converter has been proposed heretofore. When the shading affects image signals of one line containing the maximum brightness Io of an image that is obtained by picking up a reference density board (e.g. a while board), characteristics as shown in FIG. 6 are revealed. If the coefficient showing the shading effect at coordinates (x, y) in this figure is denoted by S (x, y), an image signal f (x, y) is expressed by $$f(x, y) = Io \cdot S(x, y) \quad \ldots \quad (1)$$

If a signal obtained by sampling f (x, y) is denoted by f (m, n) (m,n∈Z, Z≜{0,±1,±2, . . . }) in consideration of the case when said image signal is given to an A/D converter of a parallel comparison type to be sampled and quantized, an output D (m, n) in the A/D converter is represented by the following equation.

$$D(m, n) = K \cdot \frac{f(m, n)}{V_{ref}} \quad (2)$$

where K denotes a scaling coefficient, and $V_{ref}$ a reference voltage of the A/D converter.

Next, when an image not subjected to the shading effect is denoted by fo (m, n) and a coefficient obtained by sampling S (x, y) is denoted by S (m, n), $$f(m, n) = fo(m, n) \cdot S(m, n) \quad \ldots \quad (3)$$

is established from the relation of the equation (1), and therefore an equation $$D(m, n) = K \cdot \frac{fo(m, n) \cdot S(m, n)}{V_{ref}} \quad (4)$$

can be established from the equations (2) and (3). An image signal cleared of shading by correction in real time can be obtained by varying the reference voltage $V_{ref}$ so that it be in proportion (the constant is denoted by G) to S (m, n). That is, $$V_{ref} = G \cdot S(m, n) \quad \ldots \quad (5)$$

From the equations (4) and (5), D (m, n) is determined as $$D(m, n) = \frac{K}{G} \cdot fo(m, n). \quad (6)$$

Thus, the output D (m, n) of the A/D converter turns to be an image signal being independent of the shading effect, i.e. a signal cleared of shading by correction.

Accordingly, a method has been proposed heretofore wherein: a reference white called a reference density board is picked up before an image is read, a pickup signal thus obtained is converted into a digital signal by an A/D converter 1 and then stored in a one-line memory 3 through a tri-state buffer 2 as shown in FIG. 7, the signal stored therein is read out as a shading correction signal at the same timing with that of one-line scanning by a pickup element on the occasion of subsequent reading of the image and is passed through a tri-state buffer 4 and converted into an analog signal by a D/A converter 5, and a conversion output therefrom is applied as the reference voltage $V_{ref}$ on the A/D converter 1 so that the shading correction be executed simultaneously with the conversion in the A/D converter 1.

The reference voltage $V_{ref}$ of the A/D converter 1 applied thereon When the shading correction signal is read is supplied as a voltage obtained by converting the full-scale entire bit high level data from a tri-state buffer 6 into an analog signal by the D/A converter 5. Numeral 7 denotes an inverter for selecting either the buffer 4 or 6, and mark A a reference voltage switching signal. FIG. 6 shows the construction of the A/D converter 1 of a parallel comparison structure employed therein. Mark 1a denotes a split resistor group, 1b a comparator group, 1c an encoder, and 1d a latch. FIG. 8 is a timing cart of the operation of a circuit shown in FIG. 9.

In the shading correcting method shown in FIG. 7, however, a range of conversion is 0v substantially, and a signal to be cleared of shading by correction (i.e. an input signal to the A/D converter 1) and a shading correction signal (the reference voltage $V_{ref}$) are to have the same voltage, since the data of the shading correction signal stored in the one-line memory 3 are applied, without any modification, as the reference voltage $V_{ref}$ of the A/D converter 1 at the time of correction, particularly in an A/D conversion operation out of the effective period of an image. Moreover, considerable noise from other circuits or the like is mixed in these signals, and thereby a change in voltage is caused in both the signal to be cleared of shading by correction and the shading correction signal.

The A/D converter 1 conducts determination, therefore, on the basis of the respective changes in voltage of the signal to be cleared of shading by correction and the shading correction signal, but the result is that the output thereof is set to be either the maximum value (all bits are at high level) or the minimum value (all bits are at low level), since the range of conversion is 0v substantially as stated above.

When this shift of the output to the maximum or minimum value occurs in a relatively short cycle by the effect of noise or the like, a number of comparators, output circuits, etc. inside the A/D converter repeat ON/OFF operations almost at the same time, and consequently a large variation in current occurs in the A/D converter.

This large variation in current involves a relatively high frequency, and it is a variation not existing in a signal waveform. Therefore it has a large possibility of causing an effect as the noise of the signal to be cleared of shading by correction. Since a relatively large amount of current flows through a source of generation of the noise, in addition, there is a large possibility that it mixes in a power source having small impedance and a grand line as the noise having a larger amplitude than in an ordinary case.

The noise caused by the values of the signal to be cleared of shading by correction and of the shading correction signal of this A/D converter mixes in a black level which is to operate as a reference level for pickup signals, as shown in FIG. 9, and this causes a large fluctuation of the black level, which has an extremely adverse effect on the formation of an image.

According to the conventional method, as described above, the deterioration of the quality of the image is large considerably due to the generation of the noise caused by the voltage values of the signal to be cleared of shading by correction and the shading correction signal which are applied on the A/D converter out of the effective period of the image.

SUMMARY OF THE INVENTION

An object of the present invention is to secure a range of conversion of the A/D converter on the occasion of the timing out of the effective period of an image so as to prevent the signal to be cleared of shading by correction and the shading correction signal from having the same voltage value and thereby to prevent the generation of noise and the consequent deterioration of the quality of the image.

According to a shading correcting method of the present invention to attain the aforesaid object, an image signal and the aforesaid shading correction signal are designed to have different levels from each other on the occasion of the timing out of the effective period of the image signal.

Moreover, a shading correcting apparatus of the present invention enabling the attainment of the aforesaid object is provided with an A/D converter which converts an image signal into a digital signal and a reference voltage switching circuit which switches over a shading correction signal set as a first reference voltage of said A/D converter and a reference signal being set as a second reference voltage and different from said correction signal and applies same of these signals on said A/D converter, wherein said first reference voltage is outputted on the occasion of the timing during the effective period of the image signal by said reference voltage switching circuit while said second reference voltage is outputted thereby on the occasion of the timing out of the effective period. Other purposes and characteristic features of the present invention will be made apparent hereunder together with the description of drawings.

DESCRIPTION OF THE PREFERRED EMBODIMENT

Figure 1:
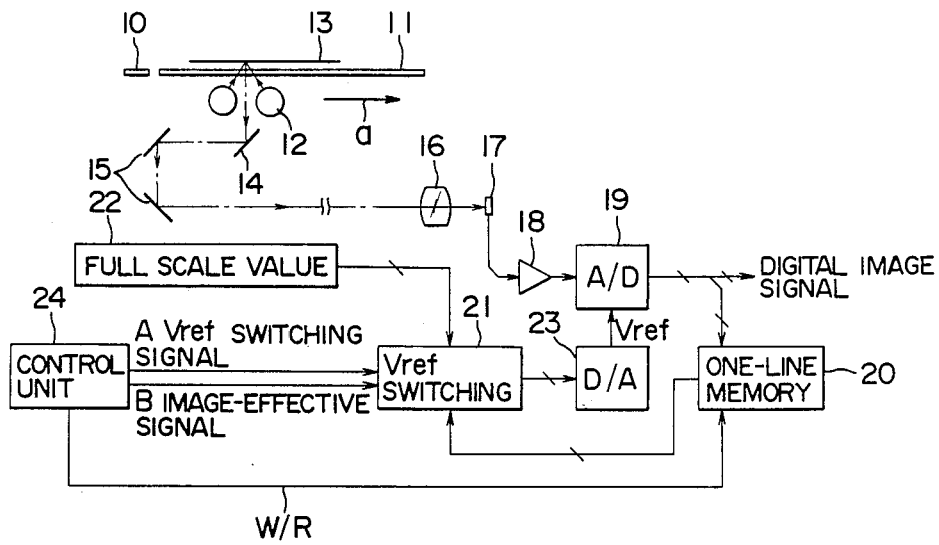
FIG. 1 is a block diagram of an image reading apparatus of one embodiment of the present invention.

FIG. 1 is a block diagram of an entire image reading apparatus to which the shading correcting method of the present invention is adapted.

In this embodiment, a reference density board 10 is provided adjacently to a document glass plate 11, and density informations of the reference density board 10 are focused on an image pickup element 17 of CCD or the like via a first mirror 14, a V mirror 15 and a focusing lens 16 prior to the exposure of an original 13 by moving scan of a light source 12 in the direction of an arrow a. An image signal obtained by said image pickup element 17 is passed through a buffer 18, converted into a digital signal by an A/D converter 19 and then written as a reference signal into a one-line memory 20, and the signal is used as a reference voltage $V_{ref}$ (first reference voltage) in the subsequent A/D conversion of the image signal of the original. Numeral 21 denotes a reference voltage switching circuit, and this circuit operates so that a full scale value from a full scale value generating source 22 be applied, via a D/A converter 23, on the A/D converter 19 as a reference voltage (second reference voltage) when the informations of the aforesaid reference density board 10 are subjected to A/D conversion, and that, on the other hand, the reference voltage (first reference voltage stored in the one-line memory 20 as stated above be applied, via the D/A converter 23, on the A/D converter 19 when an image signal is subjected to A/D conversion. The switching operation of this reference voltage switching circuit 21 and the read/write switching of the one-line memory 20 are performed by a control unit 24.

Figure 2:
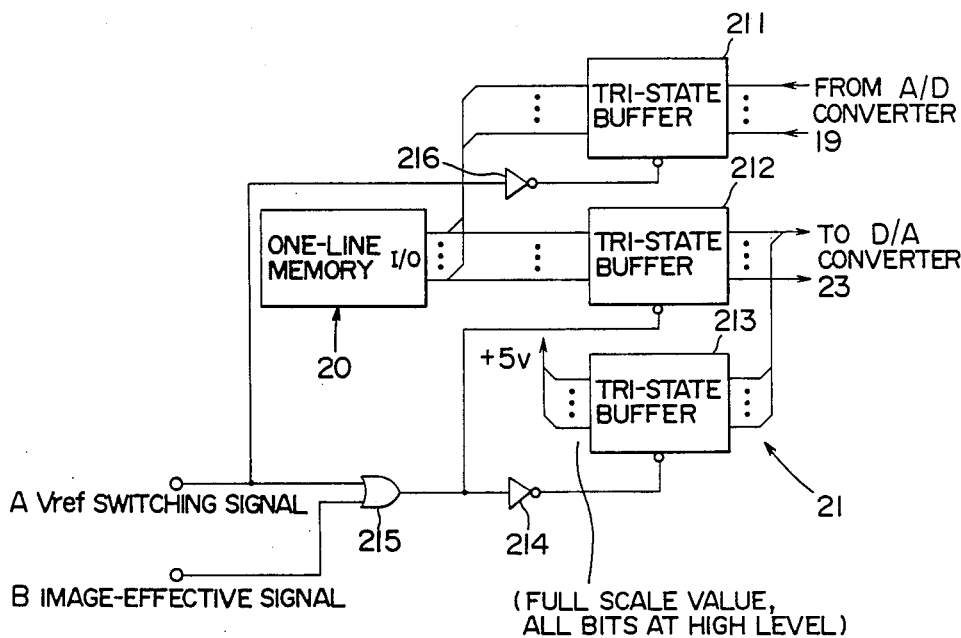
FIG. 2 is a circuit diagram of a switching element for switching over reference voltages which are supplied to an A/D converter conducting shading correction.

In the present embodiment, the reference voltage switching circuit 21 is constructed, as shown in FIG. 2, of a tri-state buffer 211 for writing the reference voltage in the one-line memory 20, a tri-state buffer 212 for reading the reference voltage out of the one-line memory 20, a tri-state buffer 213 for taking out the full scale value, an inverter 214 for selecting either of the buffers 212 and 213, an OR gate 215 for applying a reference voltage switching signal A and an image-effective signal B, and an inverter 216 for controlling the buffer 211.

Figure 3:
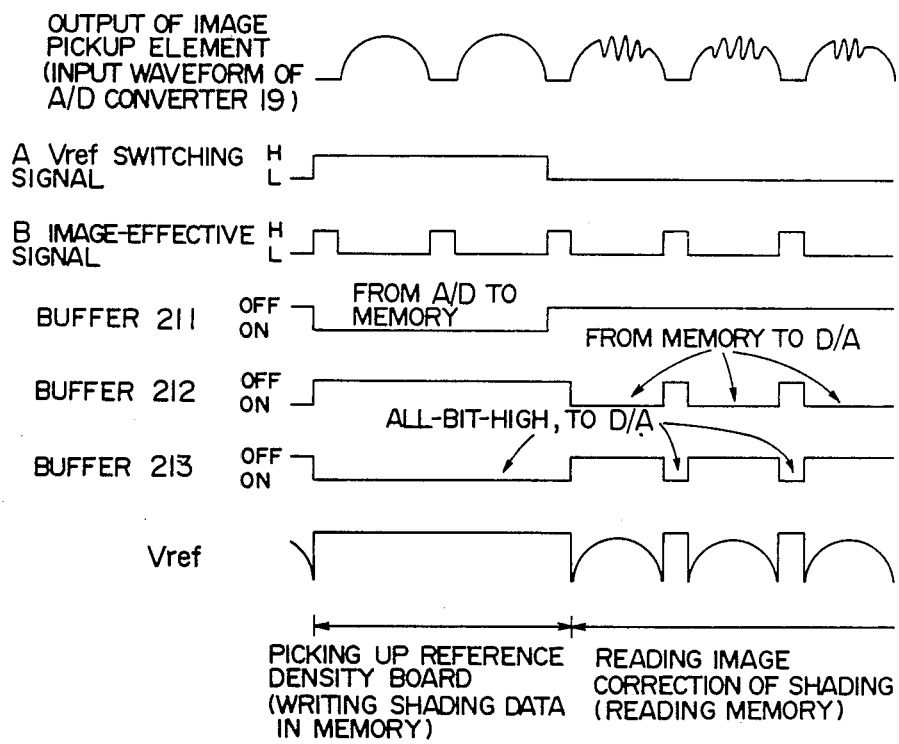
FIG. 3 is a timing chart of an operation shown in FIG. 1.
Figure 4:
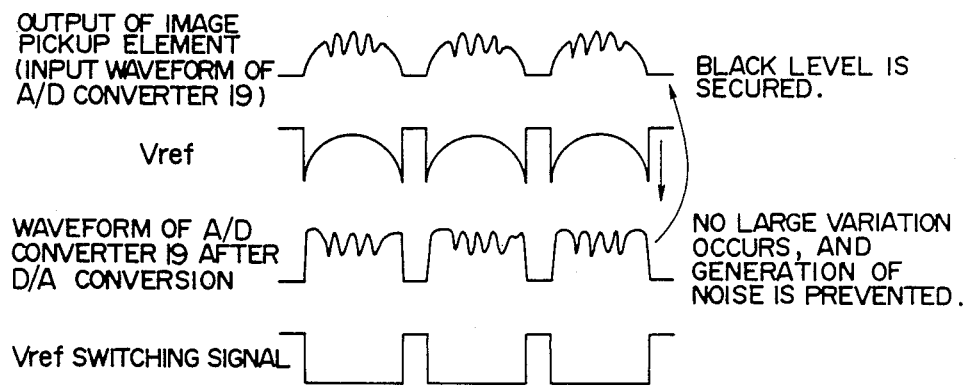
FIG. 4 is a timing chart for exemplifying the shading correction by the present embodiment.
Figure 5:
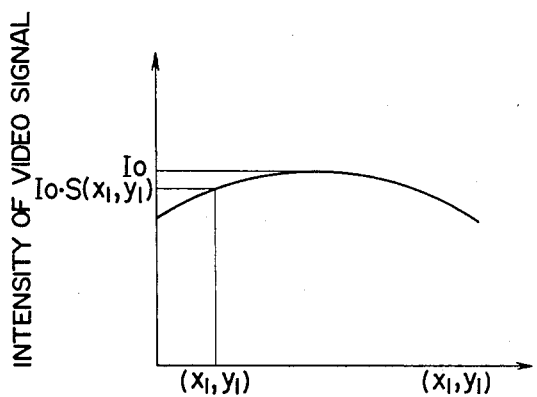
FIG. 5 is an illustration for the principle of the shading correction.
Figure 6:
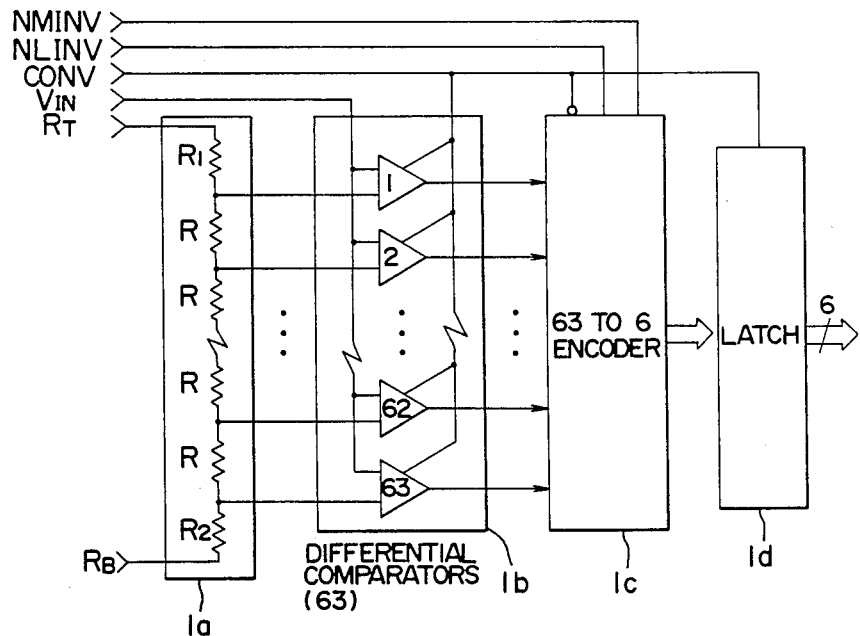
FIG. 6 is a circuit diagram of an A/D converter of a parallel comparison type for the shading correction.
Figure 7:
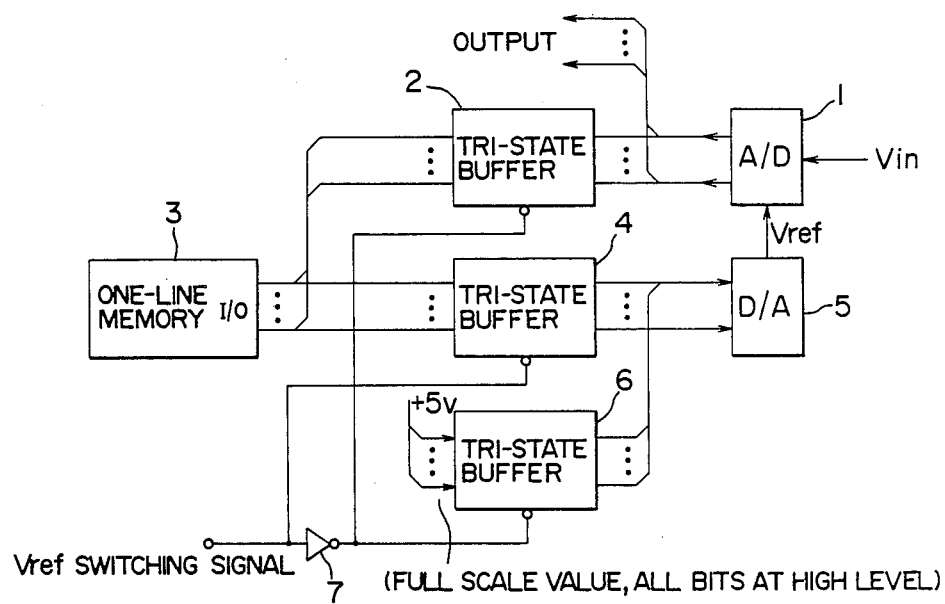
FIG. 7 is a circuit diagram of a conventional element for shading correction.
Figure 8:
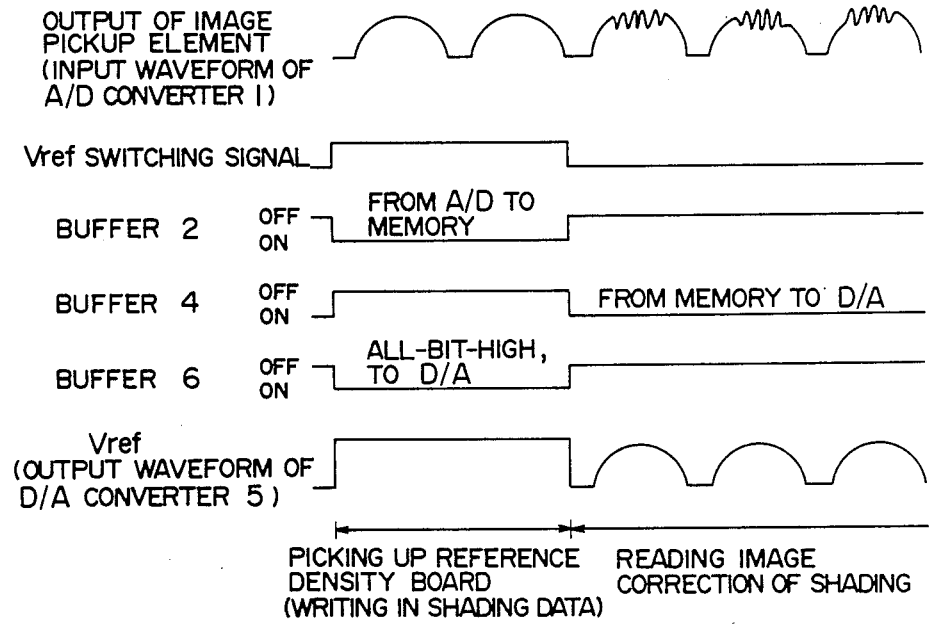
FIG. 8 is a timing chart of the element of FIG. 7.
Figure 9:
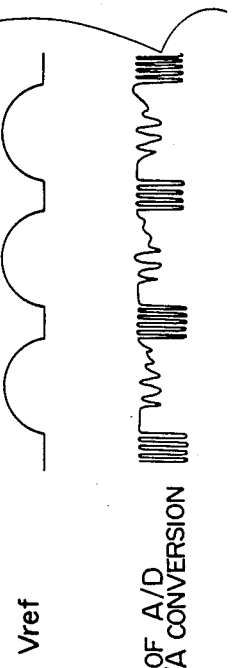
FIG. 9 is a timing chart for exemplifying conventional shading correction.

FIG. 3 is a timing chart of the operation of this circuit of FIG. 2. In the present embodiment, the image-effective signal B turns to be of high level in the timing of a signaling period out of the effective period of an image, and it goes through the OR gate 215 and closes the buffer 212, while opening the buffer 213 for the full scale value to be supplied to the D/A converter 23. When the image is read, therefore, the full scale value serves as the reference voltage of the A/D converter 19 in the timing out of the effective period of the image. Accordingly, a signal to be cleared of shading by correction and a shading correction signal do not take the same voltage value at all. Thus, the black level is secured, and the generation of noise can be prevented, as shown in FIG. 4.

While the shading correction signal is designed to be varied out of the effective period, in this embodiment, the same effect can be obtained also by varying an input signal, i.e. the signal to be cleared of shading by correction. In the above-described example, moreover, the full scale value is used as a voltage to be set out of said effective period. In this connection, another value easy to set may be used as well, because the main thing is that the signal to be cleared of shading by correction and the shading correction signal never be of the same voltage during this period.

According to the present invention, as described above, setting is so made that an input image signal and the reference voltage of the A/D converter are different from each other in the timing out of the effective period of the image signal, and therefore the present invention has characteristic features that it enables the prevention of the generation of noise and the improvement in the quality of an image.

Further, the same effect can be obtained by eliminating the tri-state buffer 213 for taking out the full scale value to simplify the circuit and by connecting each output of the tri-state buffer 212 for reading the reference voltage through each resistor to the power source to increase or pull up the output.

What is claimed is:

1. A shading correcting apparatus comprising an A/D converter which converts an image signal into a digital signal and a reference voltage switching circuit which switches over a shading correction signal set as a first reference voltage of said A/D converter and a reference signal being set as a second reference voltage and different from said correction signal and applies same on said A/D converter, wherein the aforesaid first reference Voltage is outputted during an effective period of an image signal by said reference voltage switching circuit while the aforesaid second reference voltage is outputted thereby out of the effective period.

2. A shading correcting apparatus comprising means for A/D converting an image signal into a digital signal based on a reference voltage,
    a first reference voltage generating means,
    a second reference voltage generating means, and
    means for switching said reference signal based on an effective signal of image.

\* \* \* \* \*